April 5, 1927.
W. I. TWOMBLY
1,623,566
THERMOSTATIC CONTROL
Filed May 1, 1922
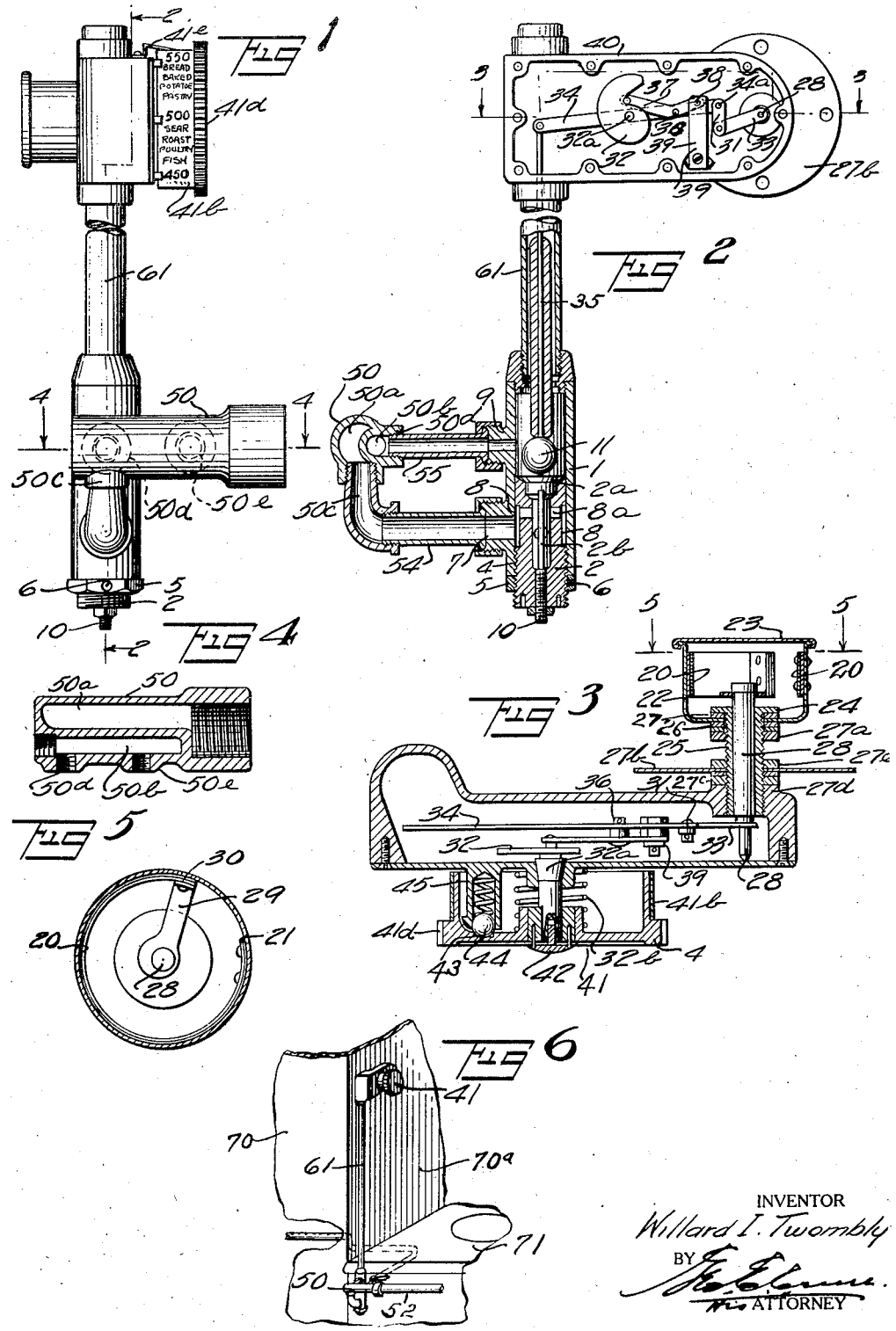
INVENTOR
Willard I. Twombly
BY
ATTORNEY Patented Apr. 5, 1927.

1,623,566

UNITED STATES PATENT OFFICE.

WILLARD I. TWOMBLY, OF NEW YORK, N. Y., ASSIGNOR, BY MESNE ASSIGNMENTS, TO THE WILCOLATOR COMPANY, OF NEWARK, NEW JERSEY, A CORPORATION OF DELAWARE.

THERMOSTATIC CONTROL.

Application filed May 1, 1922. Serial No. 557,669.

This invention relates to thermostatic control devices and more particularly to devices of this kind which are to be used for controlling the supply of fuel delivered to, a burner in accordance with the temperatures maintained by the combustion of the fuel. The present device is especially adapted for use in a gas stove and it will be described in that adaptation, though it is to be understood that it is suitable for other similar purposes.

The invention is directed to the provision of a simple, reliable and easily manipulated control device which may be readily installed on a stove and by which an even and uniform temperature of any selected value may be maintained in the oven, thus greatly simplifying the cooking of foods and lessening the attention required of the operator.

One of the features of the invention involves the provision of a novel construction for the piping through which the gas flows to the burner of the oven and in which is located the valve controlled by the thermostatic element and serving to regulate the rate of supply of gas to the burner. This novel construction is distinctive in its compactness, whereby it greatly simplifies and lessens the cost of application of the controller to the stove. It includes a conduit member having passages in it through which the gas flows to and from the thermostatically controlled valve, which member is arranged for connection to the supply pipe or manifold running along the front of the stove so as to receive gas therefrom, and also for connection to the pipe leading to the oven burner so as to supply gas thereto. The usual form of gas stove has an oven at one side thereof and a pipe, generally termed a manifold, running along the other side at the front of the stove and supplying the several burners through suitable branches provided with cocks. In accordance with this invention, the regulator is adapted for connection to the end of the manifold adjacent to the oven, to be sustained thereby and to receive gas therefrom; the regulator extends upwardly from the end of the manifold to the thermostatic element which is mounted within the oven upon the side wall thereof which is adjacent to the manifold. The portion of the regulator which is secured to the manifold includes a valve chamber and a valve therein movable toward and from a seat by the thermostatic element; preferably it also includes a supplemental manifold consisting of a casting having two passages therethrough, one receiving gas from the manifold and conveying it to the valve chamber on one side of the valve and the other receiving gas from the valve chamber on the other side of the valve and transmitting it to the oven burner. This construction reduces to a minimum the changes that must be made in the stove to install the regulator thereon, and also the labor and materials required in installing it, and by reason of its simplicity it may be manufactured at low cost.

Another feature of the invention involves the construction of the parts whereby the thermostatic element is connected to the valve which it actuates, and the coaction therewith of the manually adjustable means whereby the regulator is set for maintaining the desired temperature. This means includes a manually operated setting device and connections whereby the position of the setting device determines the effect of movements of the thermostatic element upon the valve, as by adjusting the position of a lever in the connections from the element to the valve to make the lever more or less effective to move the valve, as may be desired.

The invention includes additional novel features which will be pointed out in detail in the description to follow and illustrated in the drawings.

In the accompanying drawings, Fig. 1 is a view in elevation of a thermostatic control embodying my invention; Fig. 2 is a vertical sectional view of the thermostatic control shown in Fig. 1, the section being taken on line 2—2 of Fig. 1; Fig. 3 is a horizontal sectional view taken on line 3—3 of Fig. 2; Fig. 4 is a horizontal sectional view of the manifold adapter shown in Figs. 1 and 2; Fig. 5 is a detail section view taken on line 5—5 of Fig. 3, and Fig. 6 is a perspective view of a portion of stove showing the manner in which the control is connected to the stove and the gas manifold.

The thermostatic control per se, embodying my invention, in whatever form, comprises a thermostat of two substances having different co-efficients of expansion, which is subjected to the heat from a burner for which the control regulates the supply of fuel, a mechanical connection between the thermostat and a valve which latter coacts with a seat to control the fuel supply to the burner, and a compensating means for varying the position of the valve to maintain the desired temperatures. Preferably, the means for varying the position of the valve is located adjacent the thermostat, and the valve and seat are located at a distance from the thermostat preferably at a point adjacent the burner.

Referring now to the drawing, 1 designates a suitable casing in which a valve seat 2 is held in any desired adjusted position. As shown, the seat comprises a cup shaped portion having a bevel $2^a$ on the inner edge of which the valve 11 seats. The valve seat 2 has a screw threaded portion 3 which works in a screw threaded portion 4 of the casing. After the seat has been adjusted to the required position in the casing, and this is necessary because of the differences in the amounts of expansive movement of thermostats of the same kind at the same temperatures, the seat is locked in that position by means of a nut 5 and pin 6. If it becomes necessary at any time thereafter to remove the seat for cleaning, it may be easily removed from the casing and returned without further adjustment.

7 designates an inlet for the fuel, which may be gas, to the casing 1. When the control is used in connection with a gas stove, the inlet 7 is connected with the manifold of the gas stove through what I have termed a supplemental manifold 50 to be hereinafter described. The gas passes into the cup portion of the seat through the openings 8, $8^a$, past the valve 11, through the passage 9 in the casing 1 to the supplemental manifold 50 and from there to the burner for the oven. It will be observed that the flow of gas through the inlet 7 is deflected upward, then inward and again upward before passing the valve 11 which has the effect of permitting any impurities in the gas falling to the bottom of the well $2^b$ before reaching the seat 2. The impurities may be removed when the valve is removed for cleaning. Also by reason of the spherical surface of the valve resting on the inner edge of the bevel $2^a$ there is little chance of any impurities collecting at that point to prevent the valve seating. 10 designates a rod which is adjustable in the valve 2, and may be used to prevent the valve seating in the event that a slight flow of gas is to be allowed past the valve 11 to supply a pilot light.

20 designates a thermostat composed of two substances having different co-efficients of expansion. As here shown, the thermostat is composed of two metals welded together throughout their entire length and having widely different co-efficients of expansion, as for example, steel and brass. As shown, it is C-shaped, and one end 21 is secured to the wall of a casing 22, provided with a cover 23. The casing 22 is supported by a casing 40 containing a mechanical connection and a compensating means, which in turn is supported by a tube 61 carried by the casing 1. The casing 22 is held between the flange 24 of a sleeve 25, washers 26 and 27 of some heat insulating material, and a washer $27^a$. The sleeve 25 is screw threaded exteriorly and works in a screw threaded opening in the wall of the casing 40. This arrangement permits of the casing 22 and thermostat being inserted in the oven at any depth from the adjacent side wall. The length of the tube 61 may also be varied so that the casing 22 and the thermostat may be located at any point between the top and bottom of the oven. A plate $27^b$ to cover the opening in the oven wall is also carried by the sleeve 25 and is held in position, between a shoulder $27^d$ carried by the casing 40 and washers $27^e$ and $27^c$. 28 designates a shaft extending through the sleeve 25, and journaled therein and 29 is an arm fixed on the shaft 28 and connected with the free end 30 of the thermostat. Also fixed to the other end of the shaft 28 is an arm 33 which is connected with one end of a lever 34, through a link 31, the other end of the lever being connected with a rod 35, to which the valve 11 is connected. The lever 34 is provided with a fulcrum point 36 upon which it rocks by the expansion and contraction of the thermostat 20 to seat and unseat the valve 11. It will be understood that when the thermostat expands, the valve is aided in its seating by gravity.

37 designates a lever, one end of which is pivoted at 38 to a support 39 suitably mounted within the casing 40. The other end of the lever 37 rides upon a cam 32, and intermediate the ends of the lever 37, it is connected to the fulcrum point 36. As the cam 32 is rotated in either direction it will be seen that the lever 34 will be raised or lowered (and with it the valve 11) about the connecting pin $34^a$ as a pivot. The cam 32 is carried by a shaft $32^a$ which is journaled in a wall of the casing 40, and the shaft $32^a$ is held in its bearing by means of a spring $32^b$ which is confined between the wall of the casing 40 and the inner surface of a combined cooking and setting dial 41, which is also secured to the shaft 32ª by a fastening 42. Also on the inner face of the dial 41, are depressions 43, arranged at regular intervals (50 degree intervals) which coact with a spring pressed ball 44 which is confined in a hollow projection 45 carried by the wall of the casing 40.

The combined cooking and setting dial 41 is cup shaped and of a refractory material, or material which is a non-conductor of heat, and a band 41ᵇ surrounds the cylindrical wall of the cup and has arranged thereon temperature scale divisions, equally spaced, of 10 degrees each, together with the names of food substances opposite the temperatures required for their cooking. The periphery of the cup is serrated or toothed as indicated at 41ᵈ for the purpose of radiating any heat which may be absorbed by the dial 41, and for providing for a better grip to turn the dial. A pointer 41ᵉ is secured to the casing and projects over the dial 41 and co-operates with the dial in fixing its position to maintain the different temperatures.

The setting of the device for any desired temperature is done by moving the dial 41 until that particular temperature designation on the dial lies beneath the pointer 41ᵉ. By such adjustment, the shaft 32ª is rotated so that the cam 32 carried by it causes a movement of the pivot of lever 34. The effectiveness of the connection between the thermostat and the valve is thus varied, and a greater or less movement of the thermostat, as the case may be, is required to cause the valve to shut. It follows, therefore, that by such variation in the effectiveness of the connections the valve may be made to seat at any given temperature within the range of the instrument, and when the temperature within the oven falls below this selected value the valve is immediately raised from its seat so as to permit a further flow of gas to the oven burner. In the event that a thermostatic element is employed of the type in which the extent of movement of the element varies throughout the temperature range, such variations in movement of the element may be compensated for by proper designing of the cam 32. For example, in certain elements an increase in temperature of 10° from 250° F. to 260° F. will produce a certain movement of the free end of the element, while a 10° variation at a different point in the temperature range, as from 490° to 500°, will cause a movement which is not the same as that produced by the temperature variation first mentioned. By properly designing the cam, these variations in movement of the element may be equalized so that a dial may be employed in which the scale divisions are of equal size throughout the temperature range intended to be covered by the scale.

The operation of the form of control, briefly, is as follows, it being assumed that the position of the parts shown in Fig. 2 is the low temperature position of the control, say 250 degrees F.; to set the control, for a temperature above 250° F., the dial is moved under the pointer to the desired temperature. When the dial is moved, the cam moves with it and raises the fulcrum point 36 of the lever 34, and thereby the valve. The valve 11 will be then set in the position to seat and cut off the supply of fuel when the thermostat has expanded its distance for the set temperature. As the thermostat expands, it carries with it the arm 33, which rocks the lever 34 on the fulcrum point 36 and permits the valve 11 to move to its seat under the influence of gravity.

The same operation occurs when the control is set for other temperatures. It will be understood that when the dial 41 is moved from a low temperature to a higher one the fulcrum point 36 (and with it the valve 11) is raised, and when the dial 41 is moved from a high temperature to a lower one, the fulcrum point 36 (and with it the valve 11) is lowered.

Referring now to Fig. 6 I have shown a thermostat applied to a gas stove having an oven 70 located above the top plate 71. As here shown the thermostatic control is located on the wall 70ª of the oven adjacent the top plate 71 and as being of the same construction shown in Figs. 1 to 5 inclusive. It will be obvious from these figures that the thermostat (in the casing 22) may be located at any point between the top and bottom of the oven by varying the length of the tube 61. It will also be obvious that the thermostat (in the casing 22) may be located at any point in the oven in a horizontal plane by lengthening the levers contained in the casing 40, and of course the casing 40, or having the tube 61 in an inclined plane, or by both of these changes. Further the thermostat (in the casing 22) may be arranged in the oven at any point beyond the adjacent side wall by varying the length of the sleeve 25.

By locating the thermostatic control on that wall of the oven adjacent the top plate 71, I economize in the space required to properly locate the gas stove. I am also enabled to economize in the amount of piping required to connect it with the main manifold. The foregoing advantages are secured by means of the supplemental manifold 50. This manifold shown in section in Fig. 4, is of unitary construction and may be a casting. It consists of a housing containing two separate chambers or passages 50ª and 50ᵇ. The chamber 50ª is open to the manifold pipe 52 on the end of which the supplemental manifold is threaded and gas entering the chamber 50ª flows through outlet conduit 50ᶜ to a connection 54 with the inlet 7 in the casing 1. The gas flows through the casing past valve 11, then through outlet 9 and conduit 55 into chamber 50$^b$ through the opening 50$^d$. From chamber 50$^b$ the gas flows through outlet 50$^e$ to the pipe leading to the oven burner not illustrated.

This construction is exceedingly compact and therefore may be installed upon a stove in a small amount of space with a minimum amount of piping and at small expense, and, when installed, does not detract from the appearance of the stove. As indicated in Fig. 6, the regulator is applied to the end of the stove manifold so as to be sustained thereby and receive gas therefrom, and it extends upwardly from the manifold to the point on the adjacent oven wall where the thermostatic element is to be located, this extension being the tube 61 which houses the connection whereby the movements of the thermostatic element are transmitted to the movable valve member. Preferably the connection to the stove manifold is effected by such a supplemental manifold as that shown in Fig. 4 consisting of a single casting having two passages through it, one for receiving gas from the stove manifold and the other for delivering gas to the oven burner. This special form of supplemental manifold or such other connecting device as may be employed, may be connected directly to or may be formed integral with the valve casing in which the valve member 11 moves to and from its seat, or pipes such as those designated 54 and 55 may be employed of a length determined by the locations desired for the various parts. Thus practically no change in the stove structure is required. The regulator is applied to the end of the stove manifold and the oven burner, instead of being connected to the manifold, is connected to the supplemental manifold at the point 50$^e$ provided for the purpose.

Having thus described my invention, what I claim as new is:

1. In combination, a gas stove having a manifold, an oven burner having an inlet connection near the end of said manifold, a valve for controlling the supply of gas to such burner and an integral connection located at a distance from said valve and adapted to transmit gas from said manifold to a connection of said valve and to receive gas from a connection of said valve and carry it to the inlet of the oven burner.

2. A device as claimed in claim 1, in which said valve is operated by a thermostatic element influenced by heat generated by said oven burner.

3. A thermostatic control mechanism comprising the combination of a thermostatic element having a fixed end and a free end, a chamber having a gas inlet and a gas outlet, a valve within the chamber, a lever connected at one end to the free end of the thermostat and at the other to the valve, this lever being pivotally mounted intermediate its ends, and means for varying the position of the pivot of the lever.

4. A thermostatic control mechanism comprising the combination of a curved thermostatic element having a free end and a fixed end, a shaft lying substantially in the axis of curvature of the element and connected to the free end of the latter, the shaft being given a rotary movement by the expansion and contraction of the element, a pivoted lever connected to the shaft and adapted to be rocked on its pivot by the angular movement of the shaft, a valve having a stem connected to one end of the lever, this valve being opened and closed on its seat by the rocking movement of the lever on its pivot, and means operatively connected to the pivoted lever for varying the position of the valve relative to its seat.

5. A thermostatic control mechanism comprising the combination of a casing adapted to be placed in an oven, a thermostatic element in said casing, a pivot member adapted to extend through the oven wall and to be rotated by movement of said thermostatic element, a pipe having an inlet and an outlet connection and a valve between the two, and a lever connected with said pivot member, adapted to operate said valve.

6. A complete heat control unit for ovens comprising a thermostatic element adapted to be placed in an oven near the top thereof, a valve adapted to be positioned near the bottom of the oven, a gas-tight casing enclosing said element and said valve, an operative connection between said element and said valve comprising a vertical member extending substantially the vertical distance from the valve to the element and adapted to operate by vertical movement, a manually operable control for regulating the opening of the valve and gas inlet and outlet connections adjacent each other adapted to deliver gas on one side of said valve and to receive gas from the other side of said valve.

7. A structure as defined in claim 11 in which the gas inlet and outlet connections of said unit are formed in an integral manifold adapter which is connected with and substantially forms part of said casing.

8. The combination of a valve seat, a valve, a thermostatic element adapted to bend under the influence of heat to different extents within a given temperature range but at different points on the temperature scale, means for connecting the valve and said element and manually operable means for causing relative movement between the valve and the seat, such means including a dial, and connecting mechanism such that for different positions of said dial a given angular movement thereof will cause varying degrees of movement between the valve and its seat.

9. The combination of a thermostatic element, a valve, a lever operatively connecting said valve and said element, a pivot for said lever and means for moving the position of said pivot comprising a dial and mechanism such that for different positions of said dial, a given angular movement thereof will cause varying degrees of movement of said pivot.

10. A thermostatic control mechanism comprising the combination of a thermostatic element having a varying movement throughout different temperature ranges, a valve, a seat for the valve, a connection between the thermostatic element and the valve such that the valve is opened and closed on its seat as the thermostatic element moves, and means in the connection for producing equal movements of the valve throughout temperature ranges in which the movements of the thermostatic element are unequal.

11. The combination with a gas stove having an oven, a manifold and an oven burner, of a thermostatic regulator including a thermostatic element exposed to oven temperature and a valve actuated thereby and controlling the flow of gas between the manifold and the oven burner, a supplemental manifold adapted to be connected to said manifold and having two passages through it, one of which is connected to the manifold and the other of which is connected to the burner, and conduits connecting said passages to opposite sides of said valve.

12. A manifold for use with a thermostatic control device comprising a casing having a pair of chambers, a gas inlet to one of the chambers in one end of the casing, a gas outlet from this chamber at the other end of the casing in the side wall of the latter, and a gas inlet and a gas outlet in the second chamber in the side wall of the casing.

13. The combination with a gas stove having a manifold, an oven and an oven burner, of a thermostatic regulator including a thermostatic element, a valve chamber and a valve within the chamber connected to and actuated by the element, a supplemental manifold secured to said manifold and having two passages through it one of which is connected to the passage through the stove manifold and the other of which is connected to the oven burner, and pipes connecting the two passages of the supplemental manifold to the said chamber on opposite sides of the valve therein.

14. A thermostatic temperature regulator comprising the combination of a thermostatic element, a valve chamber having a valve therein, a mechanical connection from the thermostatic element to the valve, a casing enclosing the thermostatic element and the said connection and communicating with the said chamber whereby the escape of gas flowing past the valve is prevented, a manually operable dial mounted on the exterior of the casing and having a part projecting into the interior of the casing, means operated by movements of the dial and acting upon the connection for regulating the effect of movements of the thermostatic element upon the said valve, and connections to the said chamber for admitting gas thereto and permitting it to flow therefrom at opposite sides of the said valve.

15. The combination with a gas stove having an oven at one side thereof and a manifold pipe extending along the other side of the stove at the front thereof, of a thermostatic temperature regulator comprising a member adapted to be secured to the end of the manifold pipe of the stove in communication therewith, a valve within the member movable therein to regulate the flow of gas entering the member from the manifold pipe and supplying the burner of the oven, this valve comprising a seat and a movable member adapted to cooperate therewith and provided with a stem, a thermostatic element mounted within the oven upon the side wall thereof in spaced relation to the member on the manifold and a mechanical connection from the element to the valve stem through which movements of the element are transmitted to the movable member of the valve.

16. The combination with a gas stove having an oven at one side thereof and a manifold pipe extending along the other side of the stove at the front thereof, of a thermostatic temperature regulator comprising a member adapted to be secured to the end of the manifold pipe of the stove in communication therewith, a valve within the member movable therein to regulate the flow of gas entering the member from the manifold pipe and supplying the burner of the oven, this valve comprising a seat and a member movable toward and away from the latter, a thermostatic element mounted within the oven upon the side wall thereof in spaced relation to said valve, a mechanical connection from the element to the movable member of the valve through which movements of the element are transmitted to the movable member, and a manually adjustable device located outside the oven and cooperating with said connection for regulating the effect of movements of the element upon the valve.

17. The combination with a gas stove having an oven at one side thereof and a manifold pipe extending along the other side of the stove at the front thereof, of a thermostatic temperature regulator comprising a member adapted to be secured to the end of the manifold pipe of the stove in communication therewith, a valve within the member having a part movable toward and away from a seat therein to regulate the flow of gas entering the member from the manifold pipe and supplying the burner of the oven, a thermostatic element mounted within the oven upon the side wall thereof, a tube extending from the thermostatic element to the valve, and a rod extending through the tube, said rod being moved lengthwise within the tube by the thermostatic element and being arranged to move the movable part of said valve relatively to its seat.

WILLARD I. TWOMBLY.